UNITED STATES PATENT OFFICE.

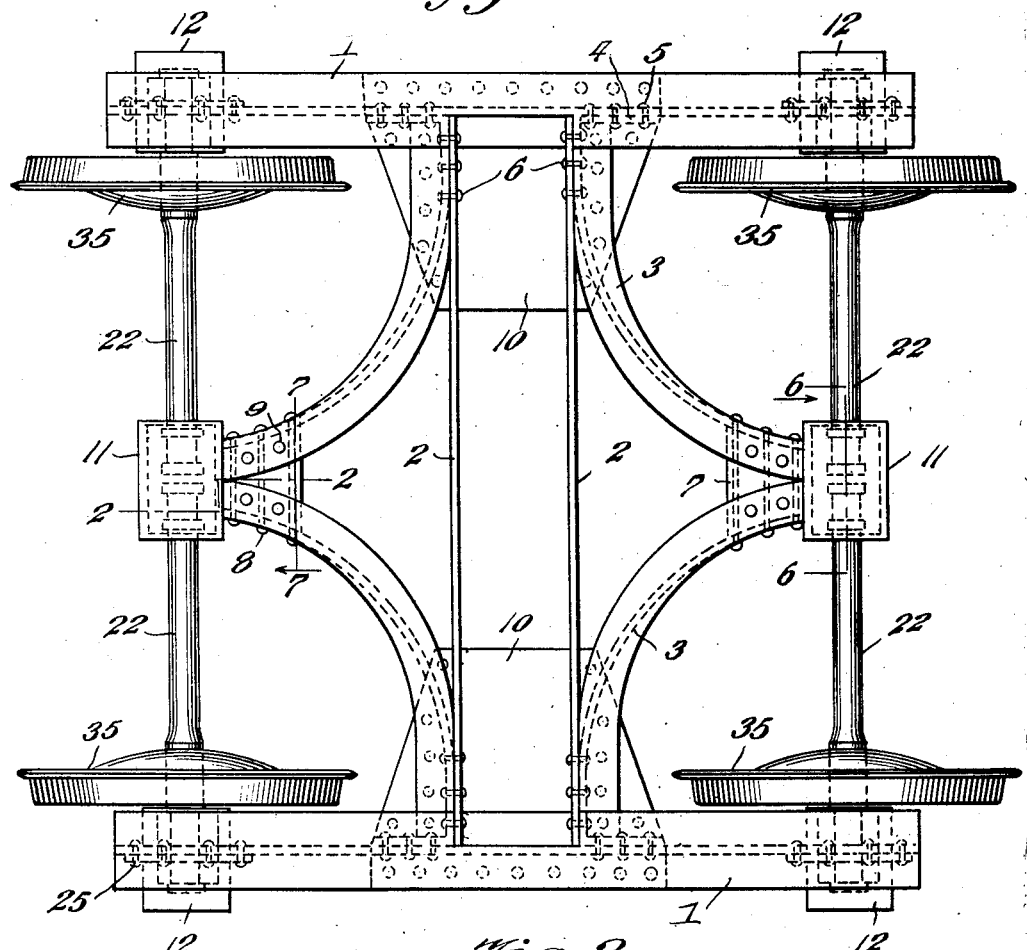
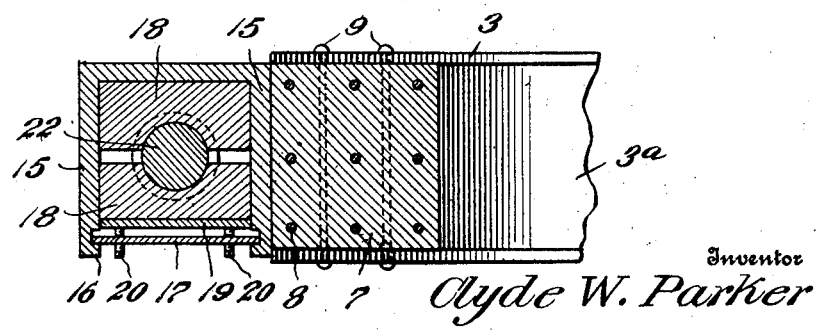

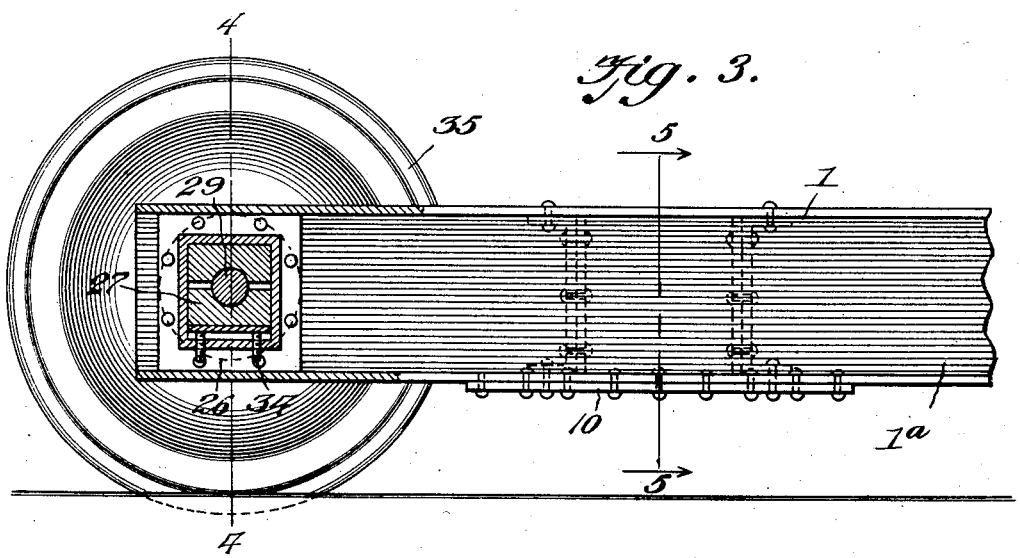
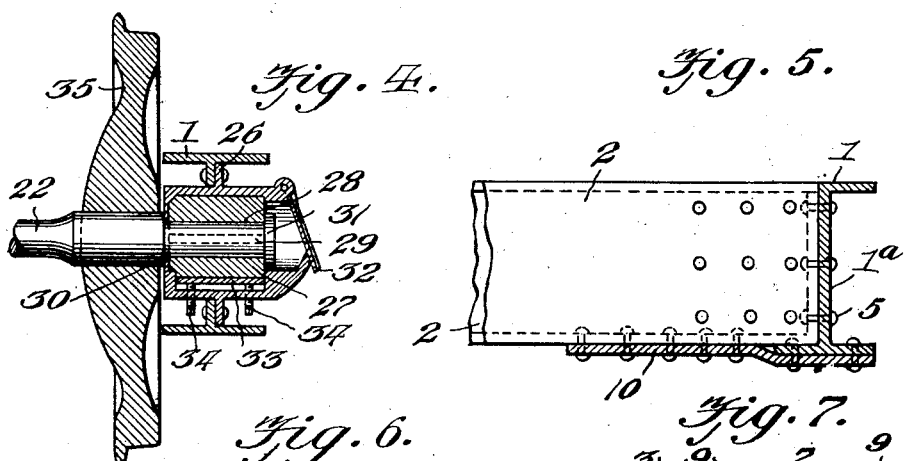
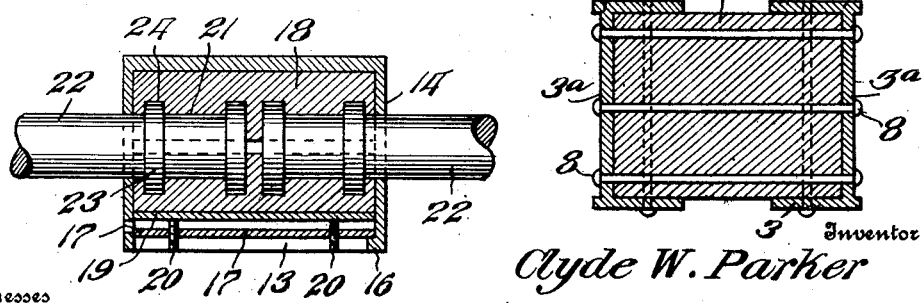

CLYDE W. PARKER, OF ELGIN, OREGON.

CAR-WHEEL AXLE.

No. 919,068.     Specification of Letters Patent.     Patented April 20, 1909.

Application filed March 7, 1908. Serial No. 419,736.

*To all whom it may concern:*

Be it known that I, CLYDE W. PARKER, a citizen of the United States, residing at Elgin, in the county of Union and State of Oregon, have invented new and useful Improvements in Car-Wheel Axles, of which the following is a specification.

My invention relates to car wheel axles, and its primary object is the provision of an axle constructed to permit one wheel to revolve independently of the other, thereby preventing the slipping of the inner wheel on a curve, the invention comprehending a novel construction of axle divided in two parts centrally of its length.

A further object of my invention is the provision of a truck especially adapted to receive the two-piece axle.

A still further object of my invention is to provide an axle truck which is simple, durable and efficient, and which can be manufactured and sold at a comparatively low cost.

With the above and other objects in view, the invention consists in the construction, combination and arrangement of parts hereinafter fully described, claimed and illustrated in the accompanying drawings, wherein:

Figure 1 is a top plan view of car wheel axles and truck constructed in accordance with my invention. Fig. 2 is a vertical sectional view taken on the plane indicated by the line 2—2 of Fig. 1. Fig. 3 is a view in side elevation of a fragmentary portion of the car wheel truck, the outer bearing and a portion of the side beam of the truck being in section. Fig. 4 is a vertical sectional view taken on the plane indicated by the line 4—4 of Fig. 3. Fig. 5 is a vertical sectional view taken on the plane indicated by the line 5—5 of Fig. 3, looking in the direction indicated by the arrow. Fig. 6 is a vertical sectional view taken on the plane indicated by the line 6—6 of Fig. 1, and Fig. 7 is a similar view taken on the plane indicated by the line 7—7 of Fig. 1.

Similar numerals of reference indicate the same parts in the several figures of the drawings.

The sides 1 of the car wheel truck preferably consist of I-beams which are united in proper relatively spaced relation by means of cross bars 2. The cross bars 2 preferably consist of flat pieces of metal disposed in parallel spaced relation. Arcuate supporting bars 3 are each secured at one end to the sides 1 on opposite sides of the cross bars 2, said supporting bars extending in opposite directions from the cross bars, and their free ends meet on the longitudinal center of the truck. The supporting bars 2 are preferably constructed of I-beams coextensive in height with the width of the webs $1^a$ of the sides 1. The attached ends of the supporting bars 3 are located between the flanges of the sides 1, and are provided with angular securing members 4, which are extensions of their webs $3^a$. Rivets 5 pass through the webs $1^a$ of the sides 1 and the attaching members 4 to secure the supporting bars in applied position.

The webs $3^a$ of the supporting bars 3 are disposed in alinement with the inner edges of the flanges of the bars at their attached ends and in alinement with the outer edges of the flanges at their free ends, thereby permitting the supporting bars 3 to be secured to the cross bars 2 by means of rivets 6, and to adapt the free ends of the supporting bars for the reception of bearing carrying blocks 7. The bearing carrying blocks 7 are secured in applied position by means of rivets or bolts 8 which pass through the blocks and through the webs $3^a$ of the supporting bars 3 and by means of rivets or bolts 9 which pass through the blocks and through the flanges of the supporting bars. The bearing blocks 7 rest upon the flanges between the opposing surfaces of the web $3^a$ of the supporting bars. In view thereof, and the manner of passing the rivets or bolts 8 and 9 through the blocks 7 and the supporting bars 3, the blocks are capable of standing any strain to which they may be subjected. In order to strengthen the connection between the sides 1, the cross bars 2 and the supporting bars 3, bracket plates 10 are secured to the lower flanges of the sides 1 and the supporting bars 3. Each block 7 carries a journal box 11 which is alined with a pair of journal boxes 12 carried by the sides 1. The journal boxes 11 may be formed integrally with the blocks 7, and preferably consist of rectangular structures having open under sides 13 and openings in their walls, said openings extending through the lower edges of the end walls so as to permit the inner ends of the axle sections to be taken down through the bottom of the journal boxes 11 when it is desired to remove the axles. One of the end walls 14 and the side walls 15 of each journal box 11 are provided with grooves 16 which receive a removable bottom 17, as fully disclosed in Figs. 2 and 6 of the drawings. Each of the journal boxes 11 is provided with a pair of journal brasses 18, the lower one of which is supported on an adjustable plate 19 carried by set screws 20 threadedly engaging the bottom 17 of the journal box. The journal brasses 18 of each bearing are formed to provide a circular recess 21 to receive the inner ends of the sections of axles 22, the inner ends of the axle sections being provided with annular shoulders 23 which fit in corresponding recesses 24 in the brasses 18, said shoulders preventing the axle sections from having any lengthwise movement. The journal boxes 12 are secured in openings in the webs 1ª of the sides 1 by means of rivets 25 which are let through flanges 26 formed thereon and through the webs of the sides. The journal boxes 12 are provided with journal brasses 27 which are formed to provide circular recesses 28 adapted to receive reduced journals 29 formed on the outer ends of the axles 22, the reduction of the journals 29 providing shoulders 30 at the inner ends and circular members 31 at the outer ends of the journals, the brasses 27 being confined between the shoulders and said circular members. The journal boxes 12 are provided with covers 32 which close the openings through which the bearings may be supplied with lubricant. The lower journal brasses 27 are carried by adjustable plates 33 which are mounted on set screws 34 threaded through the bottom walls of the journal boxes 12. As the lower journal brasses of the journal boxes 11 and 12 are carried by adjustably mounted plates, it should be apparent that they may be readily and quickly adjusted to compensate for wear therein and in the ends of the axles. Wheels 35 are fastened to the axles 22 in the usual manner.

It should be apparent from the above description taken in connection with the accompanying drawings, that a car wheel axle constructed in accordance with my invention will permit one wheel to revolve independently of the other, whereby to prevent the slipping of the inner wheel on passing a curve. It should also be apparent that the truck is admirably adapted for the reception of the axle, and that the axle and truck are simple, durable and efficient and can be manufactured and sold at a comparatively low cost.

From the foregoing description taken in connection with the accompanying drawing, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

1. The combination with sectional axles, of a truck comprising sides provided with bearings, curved supporting bars each secured at one end to the sides, the free ends of the bars being disposed on the longitudinal center of the truck and provided with bearings, the ends of the axle sections being journaled on the bearings.

2. The combination with sectional axles, of a truck comprising sides provided with bearings, curved supporting bars each secured at one end to the sides, the free ends of the bars being disposed on the longitudinal center of the truck, and bearing blocks secured to the free ends of the bars, the ends of the axle sections being journaled in the bearings.

3. The combination with sectional axles, of a truck comprising sides provided with bearings, curved supporting bars each secured at one end to the sides, the free ends of the bars being disposed on the longitudinal center of the truck and provided with bearings, and bracket plates secured to the sides and to the bars, the ends of the axle sections being journaled in the bearings.

4. The combination with sectional axles, of a truck comprising sides constructed of I-beams and provided with bearings, and curved supporting bars constructed of I-beams and each secured at one end to the sides, the free ends of the bars being disposed on the longitudinal center of the truck and provided with bearings, the axle sections being journaled in the bearings.

5. The combination with sectional axles, of a truck comprising sides provided with bearings, curved supporting bars each provided at one end with an angular securing member, and means passing through the members and sides to secure the bars to the sides, the free ends of the bars being disposed on the longitudinal center of the truck and provided with bearings, the axle sections being journaled in the bearings.

6. The combination with sectional axles, of a truck comprising sides, cross bars secured at their ends to the sides, and curved supporting bars each secured at one end to the sides, the sides and supporting bars being provided with bearings to receive the ends of the axle sections.

7. The combination with sectional axles, of a truck comprising sides, curved supporting bars each secured at one end to the sides, and journal boxes secured to the free ends of the supporting bars and to the sides, the ends of the axle sections being mounted in the journal boxes.

8. The combination with sectional axles, of a truck comprising sides, journal boxes secured to the sides, curved supporting bars each secured at one end to the sides, blocks secured to the free ends of the supporting bars, and journal boxes secured to the blocks, the ends of the axle sections being disposed in the journal boxes.

9. The combination with sectional axles, of a truck comprising sides, cross bars secured at their ends to the sides, curved supporting bars each secured at one end to the sides, and bracket plates secured to the sides and to the supporting bars, the sides and supporting bars being provided with bearings for the reception of the ends of the axle sections.

10. A truck comprising sides, journal boxes secured to the sides, curved supporting bars each secured at one end to the sides, and journal boxes secured to the supporting bars.

In testimony whereof I affix my signature in presence of two witnesses.

CLYDE W. PARKER.

Witnesses:
H. E. COOLIDGE,
LEE BELL.